Feb. 12, 1929.
A. F. O'CONNOR
1,701,540
DROP BRAKE SHAFT HOLDING MEANS
Filed June 20, 1927
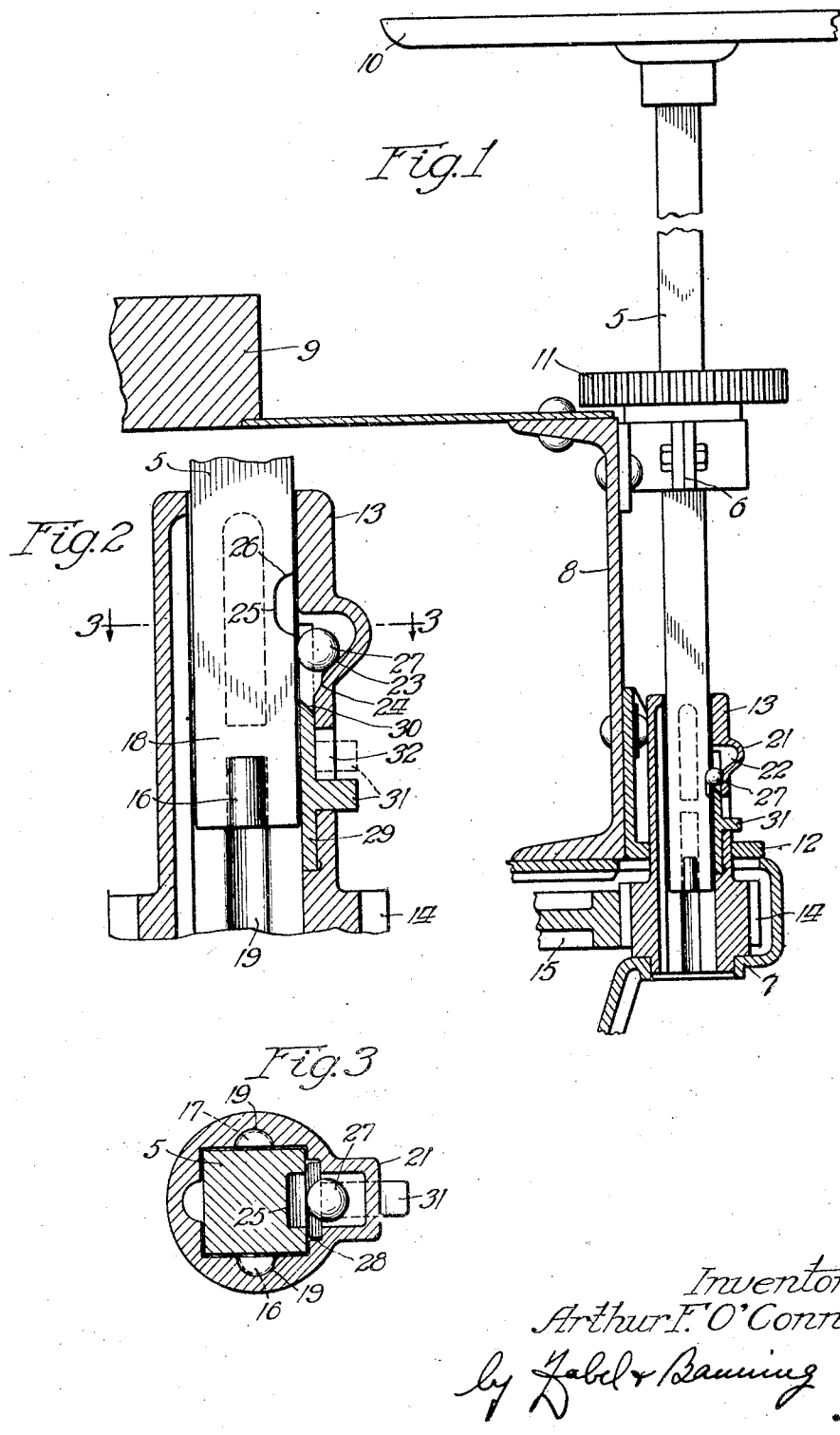
Inventor
Arthur F. O'Connor Patented Feb. 12, 1929.

1,701,540

UNITED STATES PATENT OFFICE.

ARTHUR F. O'CONNOR, OF CHICAGO, ILLINOIS, ASSIGNOR TO UNION RAILWAY EQUIPMENT COMPANY, OF CHICAGO, ILLINOIS, A CORPORATION OF ILLINOIS.

DROP-BRAKE-SHAFT HOLDING MEANS.

Application filed June 20, 1927. Serial No. 200,265.

My invention relates to drop brake shafts, and more particularly to means for holding said brake shafts in raised position when desired.

It is a purpose of this invention to provide a means of this character which serves to operate purely by gravity to lock the shaft in raised position after it has been raised by the operator and to securely hold the shaft in this position until such time as it may be released at the will of the operator.

It is also a purpose of this invention to provide a locking device of this character which will not project outwardly away from the brake shaft so as to be accidentally struck by anything and thereby thrown out of locking position.

A further purpose of the invention is to provide means for holding the brake shaft in raised position, which in case of any breakage or wearing out may be readily withdrawn from the brake-shaft mounting means and replaced without in any way injuring said mounting means.

Other objects and advantages of the invention will appear as the description proceeds when taken in connection with the accompanying drawings. However, I wish it to be distinctly understood that I do not intend to limit myself to the exact details shown and described, but that I intend to avail myself of all such modifications as would occur to one skilled in this art and as fall within the scope of the claims.

In the drawings,—

Fig. 1 is a vertical sectional view showing my improved locking means applied to a brake shaft mounted on the end of a car;

Fig. 2 is an enlarged detail section illustrating the locking means in another position; and Fig. 3 is a section on the line 3—3 of Fig. 2.

Referring now in detail to the drawings, the numeral 5 represents the brake shaft, which is mounted by means of the bearings 6 and 7 upon the end sill 8 of a car which is indicated generally at 9. This brake shaft is provided with the usual handle 10 and a ratchet wheel 11, which may be engaged by any suitable means to hold the brake shaft in one position.

Within the bearing 7 and extending upwardly through the bracing plate 12 secured to the channel bar is a sleeve 13, which sleeve, as shown, is provided with a gear 14 at its lower end adapted to mesh with a gear 15, a portion of which is shown in Fig. 1, and which is secured to means for tightening the brakes, this means being of any usual type in use for that purpose. The brake shaft 5, as shown clearly in Fig. 3, is squared and fits in a square opening through the sleeve 13, so that upon rotation of the brake shaft the sleeve will rotate therewith. The brake shaft is slidable between the position shown in Fig. 2, where it is held from further elevation by means of the lugs 16 and 17 engaging the webs 18 which extend across the slots 19 provided in the sleeve 13, and a lowermost position where the handle 10 is adapted to come down into engagement with the ratchet wheel 11. The sleeve 13 is provided adjacent its upper end with an outwardly projecting portion 21 and a pocket 22 within said projecting portion, this pocket, as shown, having the lower face thereof sloping downwardly, as at 23, and provided with a slight recess, as at 24. This pocket opens directly against the shaft 5, which is provided with a cut-out portion 25 forming a shoulder at 26 for a purpose which will presently appear.

Now, in order to lock the shaft in raised position, I provide a rolling locking member, illustrated at 27, which may be of any suitable shape in order to readily roll down the inclined wall 23 of the recess 22, but which is shown in the present instance as a ball. This locking member, after the shaft has been pulled up into position where the recess 25 is opposite the pocket 22, will drop into the recess, and as the shaft is allowed to drop it will engage the shoulder 26, as shown in Fig. 1, and at the same time engage in the recess 24 so as to firmly lock the shaft against further downward movement. The ball 27 has no connection with either the sleeve or the shaft, and is free to roll within the pocket 22 so long as the shaft 5 holds it in the pocket. Of course, upon removal of the shaft, the ball itself will drop out.

In order to remove the locking ball 27 when it is desired to drop the shaft from raised position, I provide a recess 28 in the wall of the sleeve 13 below the pocket 22, and in this recess there is seated a sliding member 29 having the upper end beveled, as at 30, so that the edge farthest away from the wall of the sleeve extends above the edge adjacent the sleeve. This slide 29 is provided with a handle 31 extending out through an opening 32 in the sleeve 13, so that the slide may be moved upwardly to engage the ball 27 and push it out of the recess 24, as shown in dotted lines in Fig. 2. Having the beveled upper end 30, this slide engages the ball 27 at a point outwardly from its center so as to cause it to roll upwardly under pressure from the slide into the pocket 22. The shaft 5 is then free to fall into its lower position because the ball no longer engages with the shoulder 26, and the ball will be retained by the shaft in the pocket 22 until the shaft is again raised to permit it to fall into the recess 25 and engage the shoulder 26.

From the above description it will be seen that the lock, consisting of the ball 27, cannot be reached from the exterior of the sleeve and is completely housed within the pocket 22, so that there is very little danger of anything getting in the pocket and causing the lock to become inoperative. The sloping bottom of the pocket also aids in keeping any dust that might work down around the shaft from lodging therein and causing difficulty. The slide 29 is simple and rugged in structure, and would not be easily put out of commission by the usage to which it normally would be subjected during the life of a car. Both the locking ball and the slide, however, can be readily replaced when the shaft is removed from the sleeve, without the necessity of having any tools to effect their removal, without any danger of injuring the sleeve in removing them.

From the above description it is thought that the construction and operation of this device will be clear to those skilled in this art.

Having thus described my invention, what I claim and desire to secure by Letters Patent of the United States is:

1. In a device of the character described, a brake shaft, means for mounting said brake shaft on a car for vertical movement, a sleeve surrounding said brake shaft and means for supporting said brake shaft in raised position, comprising a shoulder on said shaft, and a rolling locking member loosely mounted in a recess in said sleeve, adapted to roll into engagement with said shoulder when said brake shaft is raised, and means for pushing said locking member out of the path of said shoulder.

2. In a device of the character described, a brake shaft, means for mounting said brake shaft on a car for vertical movement, a sleeve surrounding said brake shaft and means for supporting said brake shaft in raised position, comprising a shoulder on said shaft, and a rolling locking member loosely mounted in a recess in said sleeve, adapted to roll into engagement with said shoulder when said brake shaft is raised, and means slidably mounted in said sleeve for pushing said locking member out of the path of said shoulder.

3. In a device of the character described, a brake shaft, means for mounting said brake shaft on a car for vertical movement, a sleeve surrounding said brake shaft and means for supporting said brake shaft in raised position, comprising a shoulder on said shaft, and a ball loosely mounted in a recess in said sleeve, adapted to roll into engagement with said shoulder when said brake shaft is raised, and means for pushing said ball out of the path of said shoulder.

4. In a device of the character described, a brake shaft, means for mounting said brake shaft on a car for vertical movement, and means for supporting said brake shaft in raised position comprising a shoulder on said shaft, a rolling locking member, means for supporting said rolling locking member in position to roll beneath and engage said shoulder when the shaft is raised, and a member slidable longitudinally of said shaft for moving said locking member out of the path of said shoulder.

In witness whereof, I hereunto subscribe my name this 23rd day of May A. D., 1927.

ARTHUR F. O'CONNOR.